Oct. 10, 1967     R. J. VON FELDEN     3,345,807
AIR AND LIQUID SEPARATING DEVICE
Filed May 10, 1965     2 Sheets-Sheet 1
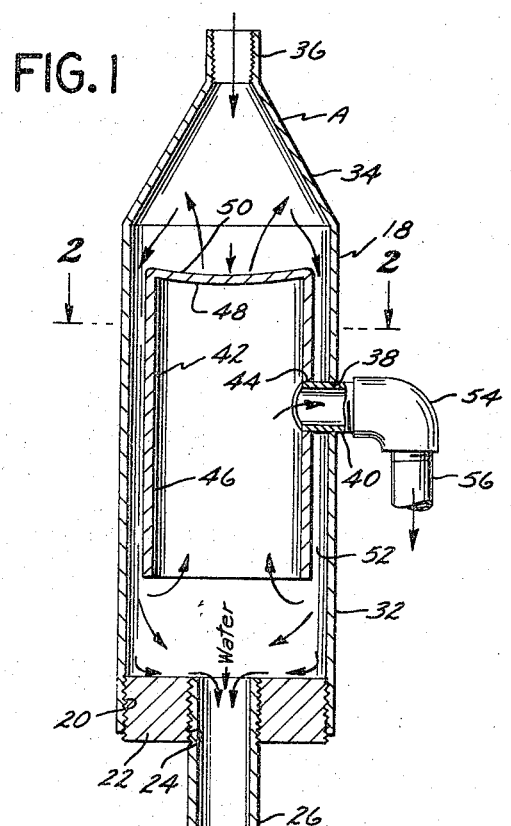
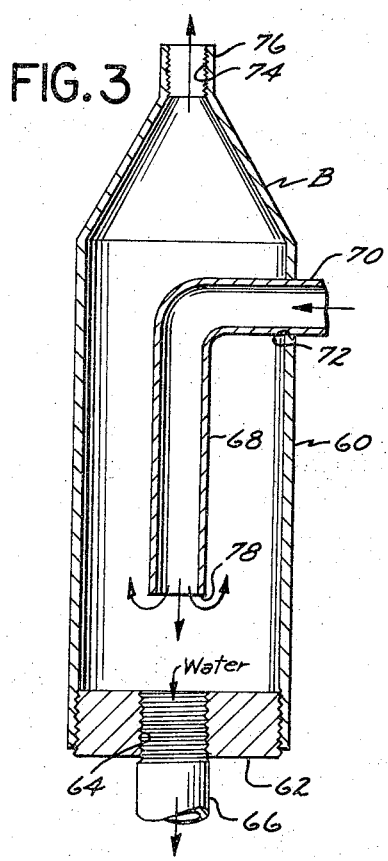
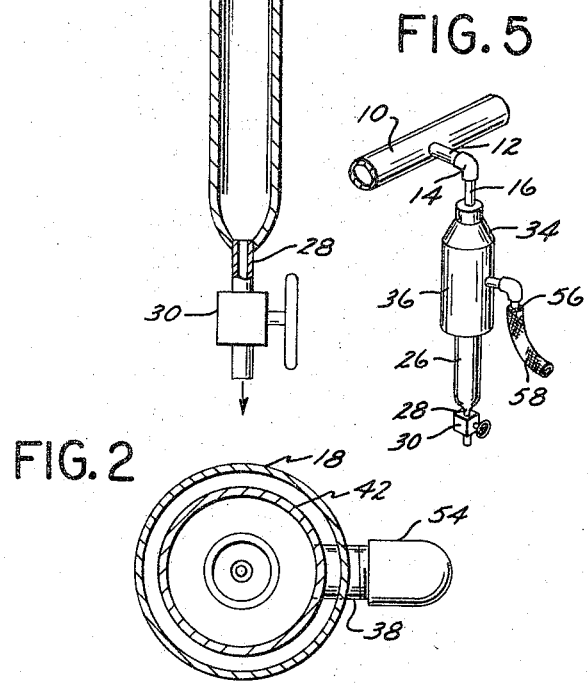
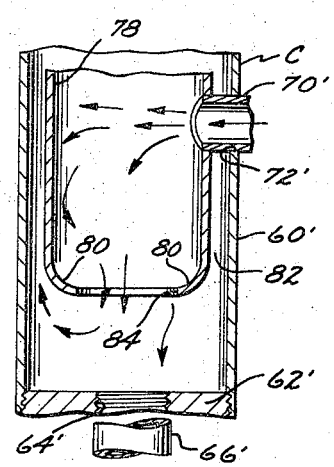
INVENTOR.
RAY J. VonFELDEN
BY
William C. Babcock
ATTORNEY 3,345,807
AIR AND LIQUID SEPARATING DEVICE
Ray J. von Felden, 13319 Flatbush,
Norwalk, Calif. 90650
Filed May 10, 1965, Ser. No. 454,482
1 Claim. (Cl. 55—433)

The present invention relates generally to fluid separating devices, and more particularly to a device for use in separating entrained water from air under pressure.

In spray painting, as well as many other industrial processes, warm air from the ambient atmosphere is compressed and stored. Subsequently, the stored air under pressure, due to variations in temperature of the ambient atmosphere, may become cooled below the dew point thereof, whereby droplets of water separate therefrom. If such droplets of water are carried with the air under pressure to a paint spray gun, the resulting paint job will be unsatisfactory.

A major object of the present invention is to provide an air and water separator of relatively simple mechanical structure that can be fabricated from standard commercially available materials, is easy to use, requires a minimum of maintenance attention, and can be retailed at a sufficiently low price as to encourage the widespread use thereof.

These and other objects and advantages of the invention will become apparent from the following description of a preferred and certain alternate forms thereof, and from the accompanying drawing illustrating the same, in which:

FIGURE 1 is a longitudinal cross-sectional view of a preferred form of the air and liquid separating device;

FIGURE 2 is a transverse cross-sectional view of the preferred form of the device;

FIGURE 3 is a longitudinal cross-sectional view of a first alternate form of the separating device;

FIGURE 4 is a partial longitudinal cross-sectional view of a second alternate form of the device;

FIGURE 5 is a perspective view of the preferred form of the device connected to a header carrying air under pressure.

Figure 6:
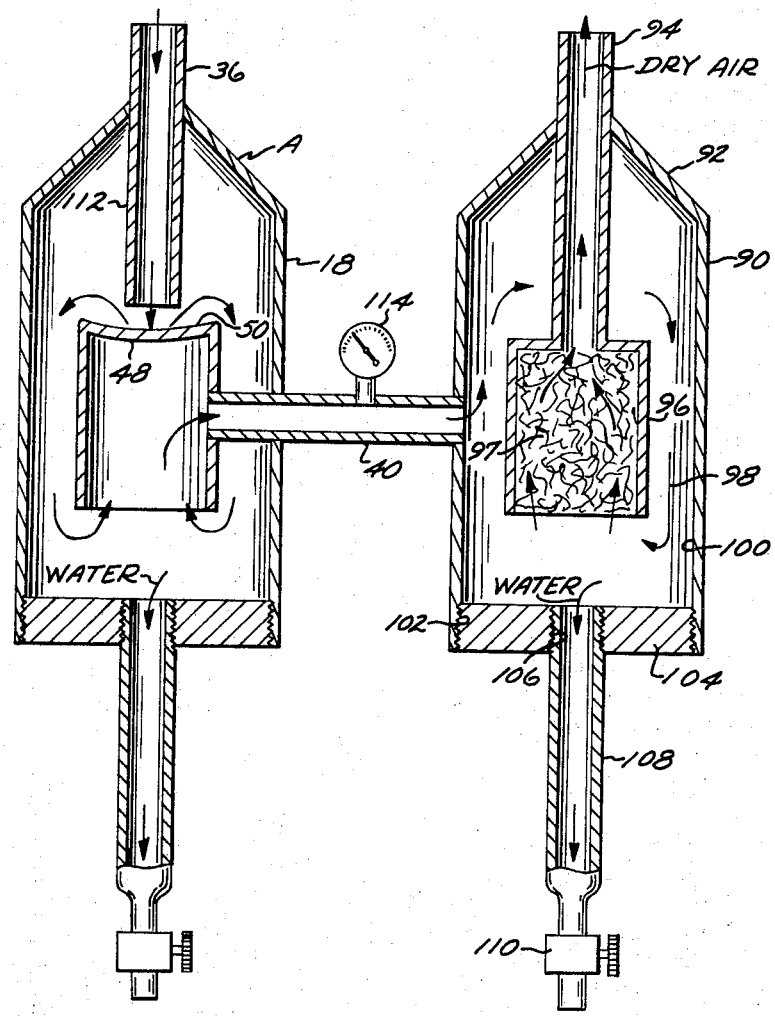
FIGURE 6 is a vertical cross-sectional view of a third alternate form of the device.

With continuing reference to the drawing for the general arrangement of the invention, it will be seen in FIGURE 5 that a header is provided which is supplied with air under pressure from a compressor (not shown). A lateral 12 extends outwardly from header 10 for each spray gun (not shown) that is to be supplied with compressed air from the header. A downturned 90° L fitting 14 is mounted on the outer end of each lateral 12, on each of which fittings a pipe nipple 16 is supported. The preferred form of the device A is threaded or otherwise connected to the lower end of nipple 16.

The device A (FIGURES 1 and 2) includes a housing 18, on the lower interior portion of which threads 20 are formed. The threads 20 engage an externally threaded plug 22, through the center of which a tapped bore 24 is formed. A tubular reservoir 26 is threaded into bore 24 and depends from plug 22. The lower end of reservoir 26 is connected to a valve 30 that is normally closed.

The housing 18 is defined by a cylindrical shell 32, the top of which develops into a frusto-conical portion 34. An internally threaded pipe collar 36 projects upwardly from portion 34, and is threadedly engaged by nipple 16. A transverse bore 38 is formed in substantially the center of shell 32, in which bore a tubular member 40 is rigidly and sealingly mounted.

An elongate inverted cup 42 is disposed in housing 18. A transverse bore 44 is formed in side wall 46 of cup 42 and is engaged by and rigidly connected to an inner end of tubular member 40. The upper end 48 of cup 42, which serves as a baffle, is slightly dished, and defines an upper concave surface 50. The external diameter of cup 42 is subtantially less than the interior diameter of shell 32, which provides an annulus-shaped space 52 therebetween.

The outer end of tubular member 40 is threaded, and as shown in FIGURE 1, is connected to a downturned 90° L fitting 54. A nipple 56 depends from fitting 54, and is connected to a length of flexible hose 58 that extends to a conventional paint spray gun (not shown), or other equipment, which to operate satisfactorily, must be supplied with air under pressure that is free of entrained droplets of water or other liquids.

Use and operation of the preferred form of the invention are relatively simple. When the device is connected to header 10 in the manner shown in FIGURE 5, air under pressure discharges into the interior of housing 18 to impinge upon the surface 50. Droplets of liquid (not shown) in the air entering the device are deflected by the surface 50 towards the interior surfaces of portion 34 and shell 32 as shown by the arrows in FIGURE 1. The droplets coalesce on the interior surfaces of portion 34 and shell 32 until they form drops of liquid of sufficient mass as to flow downwardly by force of gravity onto the upper surface of plug 22, and from this surface into the reservoir 26.

Periodically the valve 30 is opened manually to permit the liquid that has accumulated in the reservoir 26 to be blown therefrom by the elevated air pressure existing within the device. Air free of water droplets passes downwardly through the annulus-shaped space 52 and then upwardly inside cup 42 to discharge through the tubular member 40. Thereafter the fluid-free air is delivered to the hose 58 for use in the paint sprayer (not shown).

A first alternate form B of the device is shown in FIGURE 3, which includes a housing 60, the lower interior end of which is threaded and engaged by a threaded plug 62. A centrally disposed tapped bore 64 is formed in plug 62 that engages the threaded upper end of a reservoir 66 which is identical to the reservoir 26 shown in FIGURE 1. The reservoir 66 is provided with a tube 28 and valve 30 on the lower end thereof (not shown), which are in the same association as that between the tube 28 and valve 30 associated with reservoir 26.

A downturned tubular L fitting 68 is disposed in housing 60. Fitting 68 includes an inlet portion 70 that extends through an opening 72 in the housing 60, and this inlet portion is, by conventional means, sealed in opening 72. By means of a pipe union (not shown), an inlet 70, or other suitable fitting is connected to one of the laterals 12. Threads 74 are formed in a collar 76 mounted on the upper extremity of housing 60. A pipe nipple (not shown) may be connected to the collar 76 and hose 58 to supply fluid-free air to a piece of equipment such as a paint sprayer (not shown).

In the operation of the first alternate form B of the invention, air under pressure containing droplets of water discharges into the confines of the device through an opening 78 defined in the L fitting 68. Due to the velocity and momentum thereof, the fluid droplets (not shown) continue downwardly and enter the reservoir 66. The fluid-free air reverses its direction of flow, as shown by arrows in FIGURE 3, and is discharged through the collar 76, ready for use in a paint sprayer, or the like.

A second alternate form C of the invention is shown in FIGURE 4, which is similar to the first alternate form B thereof. The same identifying numerals are used in conjunction with like elements in the first and second alternate forms of the invention, but primes have been added thereto with respect to form C.

In form C of the invention, the inlet 70' is connected to the interior of an inverted cup 78, the upper end of which (not shown) is closed. Cup 78 is formed with a downwardly and inwardly extending taper 80. Cup 78 and housing 60' define an annulus-shaped space 82 therebetween.

In the operation of the second alternate form of the invention C, air and entrained droplets of liquid flow through the inlet 70' into the cup 78. The air passes downwardly into the cup 78 to discharge through an opening 84 formed in the lower portion thereof, and then upwardly through the space 82. The fluid-free air discharges from the top of the housing 60' in the same manner previously described in connection with the housing 60. Droplets of liquid in the air discharging into the cup 78 coalesce on the interior surface thereof, which serves as a baffle, and then run down the interior surface of the cup due to force of gravity, to fall onto the upper surface of plug 62'. The coalesced liquid (not shown) flows from the top of plug 62' into the reservoir 66' in the same manner as in the first alternate form B of the invention.

A third alternate form D of the invention includes the preferred form A arranged as illustrated in FIGURE 6. The tubular member 40 is connected to the interior of a cylindrical shell 90 having an upwardly tapered top 92 from which an air discharge 94 projects. The air discharge 94 extends downwardly inside shell 90 and is connected to, and supports a cylindrical holder 96 which is packed with porous material 97 such as woven nylon, cotton, or the like. The transverse cross section of holder 96 is such that an annulus-shaped space 98 is defined between it and the inerior surface 100 of shell 90.

Threads 102 are formed on the inerior surface of the lower end of shell 90 that are engaged by a plug 104. A tapped opening 106 extends downwardly through plug 104 and it is engaged by the upper threaded end of a tubular reservoir 108. Flow of liquid from reservoir 108 is controlled by a valve 110.

The preferred form A of the device as used in conjunction with the alternate form D thereof is modified by the provision of an air inlet tube 112, which is connected to the lower end of collar 36. The tube 112 is positioned within housing 18 and terminates a short distance above the convex surface 50. If desired, a conventional pressure gauge 114 may be provided on tubular member 40.

In the operation of the third alternate form of the invention shown in FIGURE 6, entrained water is removed from the air as it flows through form A of the device in the manner previously described. Air flows from the preferred form A through tube 40 into the confines of shell 90, which thereafter follows the path indicated by arrows in FIGURE 6. Any foreign particles contained in the dry air as it discharges through the woven material 97 is removed therefrom, for this woven material acts as a filter. Should any droplets of water remain in the air as it passes through the woven material, they likewise will be separated from the air prior to passage thereof through the air discharge 94. Any water which accumulates in reservoir 108 is periodically removed therefrom by means of the valve 110.

The use and operation of the invention have been described hereinabove, and accordingly need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claim.

I claim:

A device for removing droplets of water from air under pressure with which it is entrained, including:
 (a) a vertically disposed housing defined by a first cylindrical side wall, a top wall in which an inlet opening is formed and through which said air and entrained droplets of water are introduced into the housing, and a bottom wall having a centrally disposed opening formed therein;
 (b) an elongate reservoir depending from said bottom and in communication with said opening formed therein;
 (c) normally closed valve means on the lower end of said reservoir which can be opened during operation of said device to discharge water from said reservoir that has accumulated therein;
 (d) an inverted cup vertically disposed within said housing below said inlet, with the upper closed end of said cup defining a concave exterior surface from which a second cylindrical side wall extends downwardly, and with the transverse cross section of said cup being such that the exterior surface thereof and the interior surface of said housing cooperatively define a vertical annulus-shaped space therebetween; and
 (e) a tubular air outlet supported by said housing and extending through said first cylindrical wall to the interior of said cup, whereby air and entrained droplets, upon entering said housing, impinge upon said concave surface and thereafter said droplets are displaced from said concave surface by said air as it moves through said housing to flow downwardly on said surfaces defining said annulus-shaped space to said opening and reservoir, with said air, free of said droplets, passing downwardly through said annulus-shaped space to the bottom of said side wall where its direction of flow is reversed and thereafter flows upwardly through said cup to pass outwardly therefrom through said tubular air outlet.

References Cited

UNITED STATES PATENTS

| | | | |
|---|---|---|---|
| 929,270 | 7/1909 | Ashton | 55—329 |
| 969,170 | 9/1910 | Lindstrom | 55—462 |
| 1,545,748 | 7/1925 | Filkins | 55—441 |
| 1,828,626 | 10/1931 | Swendeman | 55—421 |
| 1,876,465 | 9/1932 | Misner | 55—322 |
| 2,010,456 | 8/1935 | Jones. | |
| 2,095,586 | 10/1937 | Algard | 55—330 |
| 2,402,140 | 7/1946 | Heintzelman | 55—419 |
| 2,467,408 | 4/1949 | Semon | 55—330 |
| 3,235,343 | 2/1966 | Riggins | 55—457 X |

HARRY B. THORNTON, *Primary Examiner.*

B. NOZICK, *Assistant Examiner.*